United States Patent

Hsu et al.

[11] Patent Number: 5,880,251
[45] Date of Patent: Mar. 9, 1999

[54] POLYESTER SYNTHESIS USING CATALYSTS HAVING LOW DECOMPOSITION TEMPERATURES

[75] Inventors: Chih-Pin Hsu; Ming-Yang Zhao, both of Kansas City; L. Scott Crump, Gladstone, all of Mo.

[73] Assignee: Cook Composites & Polymers Co., Kansas City, Mo.

[21] Appl. No.: 878,282

[22] Filed: Jun. 18, 1997

[51] Int. Cl.$^6$ ..................................................... C08G 63/42
[52] U.S. Cl. .......................... 528/297; 528/274; 528/302; 528/306; 528/308; 528/308.6; 524/714
[58] Field of Search ..................................... 528/274, 297, 528/302, 306, 308, 308.6; 524/714

[56] References Cited

U.S. PATENT DOCUMENTS

| | | | |
|---|---|---|---|
| 3,252,941 | 5/1966 | Mayer | 528/301 |
| 3,723,390 | 3/1973 | Carpenter | 528/281 |
| 3,804,884 | 4/1974 | Jeffrey et al. | 560/209 |
| 3,997,511 | 12/1976 | Batzer et al. | 528/289 |
| 4,306,056 | 12/1981 | Miyamoto et al. | 528/297 |
| 4,560,788 | 12/1985 | Miyamoto et al. | 560/91 |
| 4,812,553 | 3/1989 | Harris | 528/272 |
| 4,970,333 | 11/1990 | Rabon, Jr. et al. | 560/209 |
| 5,354,896 | 10/1994 | Pike et al. | 560/209 |

*Primary Examiner*—Samuel Alquah
*Attorney, Agent, or Firm*—Hovey, Williams, Timmons & Collins

[57] ABSTRACT

An improved two-stage process for the preparation of polyester resins is provided which involves an initial reaction of a dicarboxylic acid such as isophthalic acid with an alkylene oxide such as ethylene or propylene oxide in the presence of a catalyst to form an oligoester reaction mixture, followed by a second stage reaction between the oligoester reaction mixture and a dibasic acid or anhydride; a first-stage catalyst is employed which has a thermal decomposition temperature substantially at or below the second-stage reaction temperature. The most preferred first-stage catalyst is benzyltriethylammonium chloride.

19 Claims, No Drawings

POLYESTER SYNTHESIS USING CATALYSTS HAVING LOW DECOMPOSITION TEMPERATURES

BACKGROUND OF THE INVENTION

1. Field of the Invention

The present invention is broadly concerned with an improved two-step process for the preparation of polyesters wherein use is made of a first-stage catalyst having a relatively low decomposition temperature allowing substantially complete thermal decomposition of the catalyst prior to the second-stage reaction. More particularly, the invention pertains to such an improved process involving an initial catalyzed reaction between a carboxylic acid (e.g., isophthalic acid or terephthalic acid) and an alkylene oxide (e.g., propylene or ethylene oxide) in the presence of a low-degradation temperature catalyst such as benzyltriethylammonium chloride in order to form an oligoester mixture; in preferred practice, the reaction product is heated to essentially completely decompose the first-stage catalyst, whereupon the oligoester reaction product is reacted with a dibasic acid or anhydride. Advantageously, the first-stage catalyst has a thermal degradation temperature at or below the second-stage reaction temperature.

2. Description of the Prior Art

A well-known route for the production of polyester resins involves an initial reaction between a carboxylic acid and an alkylene oxide in the presence of a catalyst to form an oligoester (typically hydroxyalkyl ester) reaction product. This first-stage addition reaction is generally carried out at an elevated temperature on the order of 100°–230° C. and at a superatmospheric pressure of up to about 15 kg/cm². A variety of catalysts have been proposed for use in this context, such as simple amines (U.S. Pat. No. 4,306,056) and alkyl quaternary amine compounds (U.S. Pat. No. 4,560,788).

After the first-stage reaction is completed, it is conventional to heat the reaction mixture in the presence of an inert gas such as nitrogen in order to remove the first stage catalyst. At this point, the catalyst-stripped first-stage reaction product may be mixed with a glycol such as dipropylene glycol and the mixture is reacted with a diacid or anhydride, especially maleic anhydride at elevated temperatures and pressures. This yields the desired unsaturated polyester product.

A significant problem with prior two-stage processes for polyester resin production stems from the fact that residual first-stage catalysts remaining in the second-stage reaction mixture tends to significantly discolor the final polyester resin products. Moreover, the attempted thermal degradation of the first-stage catalysts represents a material energy input to the process, thus raising costs.

There is accordingly a real and unsatisfied need in the art for an improved two-stage polyester resin process which ameliorates the problems of resin discoloration and excess energy usage.

SUMMARY OF THE INVENTION

The present invention overcomes the problems outlined above, and provides a greatly improved two-stage polyester preparation process yielding final products having very low Gardner color numbers. Broadly speaking, the process of the invention includes the conventional steps of reacting a carboxylic acid with an alkylene oxide in the presence of a catalyst to form an oligoester reaction mixture, and thereafter reacting the oligester reaction mixture with a dibasic acid or anhydride at an elevated second-stage reaction temperature to form a polyester. However, the invention makes use of a catalyst in the first-stage carboxylic acid-alkylene oxide reaction which will thermally decompose at a temperature substantially at or below the elevated second-stage reaction temperature. Accordingly, the catalyst may be readily removed at relatively low temperatures prior to the second-stage reaction. Moreover, any residual amounts of catalyst remaining at the outset of the second-stage reaction are thermally decomposed during the course of the reaction, so that the catalyst does not adversely affect the color of the final polyester resin.

In preferred forms, the catalyst is selected from the group consisting of aryl alkyl quaternary amines and derivatives thereof. Preferred compounds of this type are selected from the formula

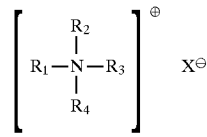

wherein $R_1$ is an aryl or $C_1$–$C_{18}$ alkyl-substituted aryl group and $R_2$, $R_3$ and $R_4$ may be the same or different and are independently selected from the group consisting of aryl groups, $C_1$–$C_{18}$ alkyl-substituted aryl groups, $C_1$–$C_4$ hydrocarbons and $C_1$–$C_4$ hydroxy-substituted hydrocarbons, and X is selected from the group consisting of a hydroxyl group, the halogens, and moieties of carbonic, bicarbonic, mono- and di-carboxylic acids. A more preferred group is where $R_2$, $R_3$ and $R_4$ are the same or different and are independently selected from the group consisting of $C_1$–$C_4$ alkyl groups and $C_1$–$C_4$ hydroxy-substituted groups, and $R_1$ is a benzyl group. The single most preferred class of catalysts are the benzyl lower trialkylammonium halogen salts, where the lower trialkyl groups are independently selected from the group consisting of the $C_1$–$C_4$ alkyls. The decomposition temperature of the catalyst of the invention should preferably be in the range of from about 100°–240° C. and more preferably from about 150°–220° C. In addition, the first-stage catalyst, when heated to a temperature greater than 50° C., has a half-life of at least 10 hrs.

The carboxylic acids used in the first-stage reaction is preferably an alkyl or aryl dicarboxylic acid, with the benzene-dicarboxylic acids being the most preferred. Isophthalic and terephthalic acids and mixtures thereof are the most commonly used acids in this context. The alkylene oxide reactant is preferably selected from the $C_2$–$C_8$ alkylene oxides with propylene oxide, ethylene oxide and mixtures thereof generally being used. The molar ratio of the first-stage alkylene oxide to carboxylic acid should preferably be in the range of from about 0.1:1 to 10:1 and more preferably from about 0.5:1 to 5:1. The first-stage reaction is normally carried out at a temperature of from about 50°–200° C., and more preferably from about 75°–150° C.; reaction pressures normally vary from about 10–400 psi, more preferably 20–100 psi. Reaction times are also variable but generally range from about 20 min. to about 20 hrs., more preferably from about 30 min. to about 10 hrs.

The second stage reaction involves reaction of the oligoesters derived from the first stage (and generally after an intermediate thermal catalyst degradation/removal step) with an unsaturated dibasic acid or its anhydride. Glycol may be added to the first-stage oligoesters at this stage, and a mixture of unsaturated and saturated dibasic acids or anhydrides can be used; in the latter case, the saturated dibasic acid or anhydride can constitute up to 80 mole percent (more preferably up to 40 mole percent) of the mixture. The preferred dibasic acids are the $C_2$–$C_{10}$ acids, for example, maleic, fumaric, citraconic, mesaconic and itaconic acids; the corresponding anhydrides can also be employed. Where saturated dicarboxylic acids or anhydrides are used in conjunction with the unsaturated acids or anhydrides, typical saturated acids or anhydrides would be phthalic, succinic, adipic, sebacic and/or dimerized fatty acids and their corresponding anhydrides.

The second-stage reaction conditions generally involve a reaction temperature of from about 150° to 250° C., a pressure of from about 0 to 100 psi and a reaction time of from about 2 to 50 hrs. The unsaturated polyesters obtained in the second-stage reaction are normally blended with one or more monomers capable of cross-linking with the vinyl groups in the resins. Examples of such monomers include styrene, vinyl toluene, p-methyl styrene, chlorostyrene, t-butyl styrene, diallyl phthalate, mono- or multifunctional lower alkyl esters of the acrylic or methacrylic acids such as methyl methacrylate and glycol diacrylate and the like. The amount of monomer in the resin ranges between about 30 to about 70% by weight. Styrene is the reactive monomer of choice. Such final resin products have very good color characteristics, typically having a Gardner color scale of less than 4 and more preferably less than 2.

DETAILED DESCRIPTION OF THE PREFERRED EMBODIMENT

The following examples are provided by way of illustration only and nothing therein should be taken as a limitation upon the overall scope of the invention.

EXAMPLE 1

In this example, a hydroxy alkyl oligoester was produced for use as a solvent in subsequent examples. The following ingredients were introduced into a two-gallon stainless steel autoclave: 15 g benzyltriethylammonium chloride (TEBAC), 1800 g xylene, and 2000 of isophthalic acid. The air in the autoclave was completely replaced by the introduction of nitrogen gas and the mixture was heated to 125° C. 1400 g of propylene oxide was then continuously added over 160 min. at a stirring rate of 200 rpm while maintaining a reaction temperature in the autoclave of 125° C. and a reactor pressure below 50 psi. After completion of the propylene oxide addition, the reaction was continued at 125° C. for an additional 60 min. at a pressure below 50 psi. The reaction product was then purged with nitrogen and subjected to a vacuum for 2 hrs. to remove the xylene. 3390 g of the oligoester A reaction product having an acid value of 15 (mg KOH/g) was obtained.

EXAMPLES 2–6

In this example, two additional hydroxy alkyl oligoesters are prepared under the conditions set in Table 1 below and as described in Example 1 using the oligoester A as a solvent. The properties of the resulting oligoesters are also given in Table 1.

TABLE 1

|  | Example 2 | Example 3 | Example 4 | Example 5 | Example 6 |
|---|---|---|---|---|---|
| oligoester A (g) | 1800 | 1800 | 1800 | 1800 | 1800 |
| isophthalic acid (g) | 2000 | — | 1000 | 2000 | 2000 |
| terephthalic acid (g) | — | 2000 | 1000 | — | — |
| propylene oxide (g) | 1400 | 1400 | 1400 | 1400 | 1400 |

TABLE 1-continued

|  | Example 2 | Example 3 | Example 4 | Example 5 | Example 6 |
|---|---|---|---|---|---|
| catalyst (g) | 15 A[1] | 15 A | 15 A | 15 B | 15 C |
| temperature (°C.) | 130 | 125 | 125 | 125 | 125 |
| maximum pressure (psi) | 50 | 50 | 50 | 50 | 50 |
| PO addition time (min.) | 200 | 200 | 200 | 240 | 150 |
| holding time (min.) | 60 | 60 | 60 | 60 | 60 |
| yield (g) | 5060 | 5030 | 5100 | 4950 | 5910 |
| ether compound (% by weight) | 8 | 5 | 8 | 6 | 5 |
| acid value | 12 | 5 | 12 | 11 | 9 |
| Gardner color scale | <1 | <1 | <1 | <1 | <1 |

[1] A is benzyltriethylammonium chloride; B is triethylamine; C is tetramethylammonium chloride

EXAMPLE 7

In this example, an unsaturated polyester is prepared. In the first step, 1910 g of the Example 2 hydroxy alkyl oligoester is placed in a reactor equipped with an agitator, thermometer, nitrogen purge apparatus and a partial reflux condenser. The oligoester is heated to 215° C. for 30 min. under vacuum ( 20 in Hg) in order to decompose and remove the catalyst. The reactor is then cooled to 180° C. and 510 g of maleic anhydride is added thereto. The mixture is heated to 215° C. and maintained at that temperature for about 8 hrs. to complete the reaction. 2010 g of unsaturated polyester resin having an acid value of 12, Gardner viscosity of S-T, and a Gardner color scale of less than 2 (viscosity and color scale measured in a 50% solution in styrene) is obtained. Styrene and hydroquinone (1080 and 1 g, respectively) are added to the unsaturated polyester resin to form a liquid resin product.

EXAMPLES 8–10

Additional polyester products are prepared using the oligoesters prepared in Examples 4–6, using the techniques described in Example 7. The polyester made using the Example 4 oligoester have a Gardner scale color of less than 2, whereas the polyesters made using the Example 5 and 6 oligoesters (i.e., those prepared using prior art catalysts) have Gardner scale colors of 5–6.

It will be appreciated that a wide variety of ingredients and reaction conditions can be followed in carrying the present invention. The following Table 2 sets forth broad and preferred approximate ranges for these reaction parameters.

TABLE 2

| Reaction Parameter | Broad Range | Preferred Range |
|---|---|---|
| First-Stage Reaction | | |
| Carboxylic Acid Type | alkyl or aryl dicarboxylic | benzene-dicarboxylic |
| Alkylene Oxide Type | $C_2$–$C_8$ alkylene oxides | $C_2$–$C_4$ alkylene oxides |
| Catalyst | aryl alkyl quaternary amines and derivatives | benzyl lower trialkyl-ammonium halogen salts |
| Reaction Temperature (°C.) | 50–200 | 75–150 |
| Reaction Pressure (psi) | 10–400 | 20–100 |
| Reaction Time | 20 min. to 20 hrs. | 30 min. to 10 hrs. |
| Alkylene Oxide: Carboxylic Acid Molar Ratio | 0.1:1 to 10:1 | 0.5:1 to 5:1 |

TABLE 2-continued

| Reaction Parameter | Broad Range | Preferred Range |
|---|---|---|
| Catalyst Removal | | |
| Decomposition Temperature (°C.) | at or below second-stage reaction temperature | 150–220 |
| Pressure (psi) | 0 to 200 | 0 to 50 |
| Reaction Time | 10 min. to 3 hrs. | 15 min. to 1 hr. |
| Second-Stage Reaction | | |
| Dibasic Acid/Anhydride | $C_2$–$C_{10}$ dibasic acids/anhydrides | $C_2$–$C_6$ dibasic acids/anhydrides |
| Reaction Temperature (°C.) | 150 to 250 | 180 to 240 |
| Reaction Pressure (psi) | 0 to 300 | 0 to 100 |
| Reaction Time | 2 to 50 hours | 5 to 20 hours |
| Dibasic Acid/Anhydride:Oligoester Molar Ratio | 1:4 to 4:1 | 1:2 to 2:1 |
| Polyester Final Product | | |
| Gardner Color | <4 | <2 |

We claim:

1. In a process for preparing a polyester including the steps of initially reacting a carboxylic acid with an alkylene oxide in the presence of a catalyst to form an oligoester reaction mixture, and thereafter reacting the oligoester reaction mixture with a dibasic acid or anhydride in a second reaction at an elevated second reaction temperature to form the polyester, the improvement which comprises the step of employing a catalyst in said initial reaction which will thermally decompose at a temperature substantially at or below said elevated second reaction temperature.

2. The process of claim 1, said carboxylic acid being a diacid.

3. The process of claim 2, said diacid being selected from the group consisting of isophthalic acid, terephthalic acid and mixtures thereof.

4. The process of claim 1, said alkylene oxide being selected from the group consisting of propylene oxide, ethylene oxide and mixtures thereof.

5. The process of claim 1, including the step of carrying out said initial reaction at a temperature of from about 50°–200° C., a pressure of from about 20–400 psi and for a time of from about 20 min. to 20 hrs.

6. The process of claim 1, the molar ratio of said alkylene oxide to said carboxylic acid in said initial reaction being from about 0.1:1 to about 10:1.

7. The process of claim 6, said molar ratio being from about 0.5:1 to about 5:1.

8. The process of claim 1, including the step of heating said oligoester reaction mixture to a temperature sufficient to decompose said catalyst, prior to said reaction between said oligoester reaction mixture and said dibasic acid or anhydride.

9. The process of claim 8, including the step of carrying out said heating for a period of from about 10 min. to 3 hrs.

10. The process of claim 8, said temperature sufficient to decompose said catalyst being from about 100° to 240° C.

11. The process of claim 1, including the step of carrying out said second reaction at a temperature of from about 150°–250° C., a pressure of from about 0–300 psi and for a time of from about 2 to 50 hrs.

12. The process of claim 1, said catalyst being selected from the group consisting of compounds of the formula

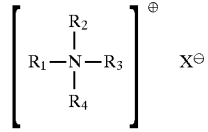

wherein $R_1$ is an aryl group or $C_1$–$C_{18}$ alkyl-substituted aryl group and $R_2$, $R_3$ and $R_4$ may be the same or different and are independently selected from the group consisting of aryl groups, $C_1$–$C_{18}$ alkyl-substituted aryl groups, $C_1$–$C_4$ hydrocarbons and $C_1$–$C_4$ hydroxy-substituted hydrocarbons, and X is selected from the group consisting of a hydroxyl group, the halogens, and moieties of carbonic, bicarbonic, mono- and di-carboxylic acids.

13. The process of claim 12, wherein $R_2$, $R_3$ and $R_4$ are the same or different and are independently selected from the group consisting of aryl groups, $C_1$–$C_{18}$ alkyl-substituted aryl groups, $C_1$–$C_4$ alkyl groups and $C_1$–$C_4$ hydroxy-substituted groups, and $R_1$ is a benzyl group.

14. The process of claim 12, said catalyst having a decomposition temperature of about 100° to about 240° C.

15. The process of claim 1, said decomposition temperature being from about 150°–220° C.

16. The process of claim 1, said catalyst, when heated to a temperature greater than 50° C. having a half life of at least 10 hrs.

17. The process of claim 1, said catalyst being benzyltriethyl-ammonium chloride.

18. The process of claim 1, including the step of adding a glycol to said oligoester reaction mixture prior to said reaction between said oligoester mixture and said dibasic acid or anhydride.

19. The process of claim 18, said glycol being dipropylene glycol.

* * * * *